United States Patent
Izumi et al.

(10) Patent No.: US 10,578,138 B2
(45) Date of Patent: Mar. 3, 2020

(54) CLIP MOUNTING SEAT

(71) Applicant: TOYOTA BOSHOKU KABUSHIKI KAISHA, Aichi-ken (JP)

(72) Inventors: Kimihiro Izumi, Mie-ken (JP); Mariko Wada, Aichi-ken (JP); Kenji Okamoto, Aichi-ken (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 4 days.

(21) Appl. No.: 15/876,725

(22) Filed: Jan. 22, 2018

(65) Prior Publication Data
US 2018/0238364 A1     Aug. 23, 2018

(30) Foreign Application Priority Data

Feb. 17, 2017    (JP) ................................ 2017-027644

(51) Int. Cl.
| | |
|---|---|
| *F16B 5/06* | (2006.01) |
| *F16B 21/18* | (2006.01) |
| *F16B 19/00* | (2006.01) |
| *B60R 13/02* | (2006.01) |
| *B60J 5/04* | (2006.01) |
| *F16B 21/08* | (2006.01) |

(52) U.S. Cl.
CPC ........... *F16B 5/0657* (2013.01); *B60J 5/0469* (2013.01); *B60R 13/0206* (2013.01); *F16B 5/0664* (2013.01); *F16B 19/00* (2013.01); *F16B 21/186* (2013.01); *F16B 21/086* (2013.01)

(58) Field of Classification Search
CPC .... B60J 5/0469; B60R 13/0206; F16B 19/00; F16B 21/086; F16B 21/186; F16B 5/0657; F16B 5/0664
See application file for complete search history.

(56) References Cited

U.S. PATENT DOCUMENTS

| | | | |
|---|---|---|---|
| 7,904,994 B2 * | 3/2011 | Girodo | ................ B60R 13/0206 24/297 |
| 7,927,050 B2 * | 4/2011 | Koike | ................... F16B 5/0628 411/104 |
| 7,954,205 B2 * | 6/2011 | Xueyong | ............ B60R 13/0206 24/289 |
| 8,291,553 B2 * | 10/2012 | Moberg | ................ B60J 5/0468 24/297 |

(Continued)

FOREIGN PATENT DOCUMENTS

JP        2009-299850      12/2009

*Primary Examiner* — Robert Sandy
*Assistant Examiner* — David M Upchurch
(74) *Attorney, Agent, or Firm* — Greenblum & Bernstein, P.L.C.

(57) ABSTRACT

A clip mounting seat in which a clip is mounted includes walls having side edges that are connected to each other and ends between the side edges, a mounting base disposed at the ends of the walls and including a stopper hole having a hole edge a part of which is open and having an opening, the stopper hole in which the clip inserted through the opening is held, and an elastic stopper extending from one of the ends of one of the walls toward the opening and being opposite the opening. The elastic stopper includes a basal portion that extends from the one end of the one wall and a clip receiver portion that extends from the basal portion toward the opening and is opposite the opening and wider than the basal portion.

19 Claims, 3 Drawing Sheets

(56) References Cited

U.S. PATENT DOCUMENTS

| | | | | |
|---|---|---|---|---|
| 8,511,631 B2* | 8/2013 | Kato | ................... | B60R 13/0206 |
| | | | | 24/297 |
| 8,584,999 B2* | 11/2013 | Liu | ........................ | G06F 1/187 |
| | | | | 248/222.12 |
| 8,585,121 B2* | 11/2013 | Marx | ................. | B60R 13/0206 |
| | | | | 24/289 |
| 8,656,563 B2* | 2/2014 | Hiramatsu | ............ | F16B 41/002 |
| | | | | 24/297 |
| 8,979,156 B2* | 3/2015 | Mally | ................... | F16B 5/0657 |
| | | | | 24/297 |
| 9,216,703 B2* | 12/2015 | Lauxen | ............... | B60R 13/0206 |
| 9,657,807 B2* | 5/2017 | Morris | ................. | F16B 5/0628 |
| 2004/0016088 A1* | 1/2004 | Angellotti | ............... | F16B 5/065 |
| | | | | 24/297 |
| 2004/0139584 A1* | 7/2004 | Gibbons | ................. | F16B 5/065 |
| | | | | 24/289 |
| 2007/0107174 A1* | 5/2007 | Bordas | ............... | B60R 13/0206 |
| | | | | 24/664 |
| 2015/0113773 A1* | 4/2015 | Iwahara | ............. | B60R 13/0206 |
| | | | | 24/594.11 |
| 2016/0129854 A1* | 5/2016 | Bachelder | ........... | B60R 13/0206 |
| | | | | 24/292 |
| 2016/0368433 A1* | 12/2016 | Vega Velazquez | ......................... | |
| | | | | B60R 13/0206 |

\* cited by examiner

CLIP MOUNTING SEAT

CROSS REFERENCE TO RELATED APPLICATION

This application claims priority from Japanese Patent Application No. 2017-27644 filed on Feb. 17, 2017. The entire contents of the priority application are incorporated herein by reference.

FIELD OF THE INVENTION

The present disclosure relates to a clip mounting seat.

BACKGROUND

A clip mounting seat in which a clip is mounted has been known. According to the disclosure, the clip mounting seat includes a mounting seat surface in which the clip is mounted and the mounting seat surface has a clip stopper hole in which a shaft of the clip is inserted. A part of a hole edge of the clip stopper hole is open and the shaft is inserted into the clip stopper hole through an opening.

The clip mounting seat includes a stopper piece. The stopper piece is disposed between a neck portion and a basal portion of the clip when the clip is inserted in the clip stopper hole and thus, the clip is less likely to be released from the clip stopper hole.

SUMMARY OF THE INVENTION

An objective of the present technology is to provide a clip mounting seat where a clip can be inserted into a clip stopper hole stably and surely.

According to the present technology, a clip mounting seat in which a clip is mounted includes walls having side edges that are connected to each other and ends between the side edges, a mounting base disposed at the ends of the walls and including a stopper hole having a hole edge a part of which is open and having an opening, the stopper hole in which the clip inserted through the opening is held, and an elastic stopper extending from one of the ends of one of the walls toward the opening, the elastic stopper being opposite the opening, the elastic stopper including a basal portion that extends from the one end of the one wall and a clip receiver portion that extends from the basal portion toward the opening and is opposite the opening and wider than the basal portion.

DETAILED DESCRIPTION OF EMBODIMENTS

In the above configuration of the background, the stopper piece extends from an upper end of a base included in the clip mounting seat toward the opening. When the clip is inserted into the stopper hole through the opening, the clip presses the stopper piece downwardly and the stopper piece is elastically deformed such that the clip is inserted into the clip stopper hole.

However, in the above configuration, the stopper piece has a narrow elongated shape and is very small with respect to an area of a clip seat surface. With such a configuration, when the stopper piece is pressed with the clip, a contact area of the clip seat surface and the stopper piece is small. Therefore, the clip may be unstable with respect to the stopper piece and tilted with respect to the mounting seat surface or the clip may be inserted from a position shifted from the opening. If the clip may be inserted through the opening with being tilted with respect to the mounting seat surface or inserted from a position shifted from the opening, the clip cannot be inserted into the clip stopper hole.

Figure 1:
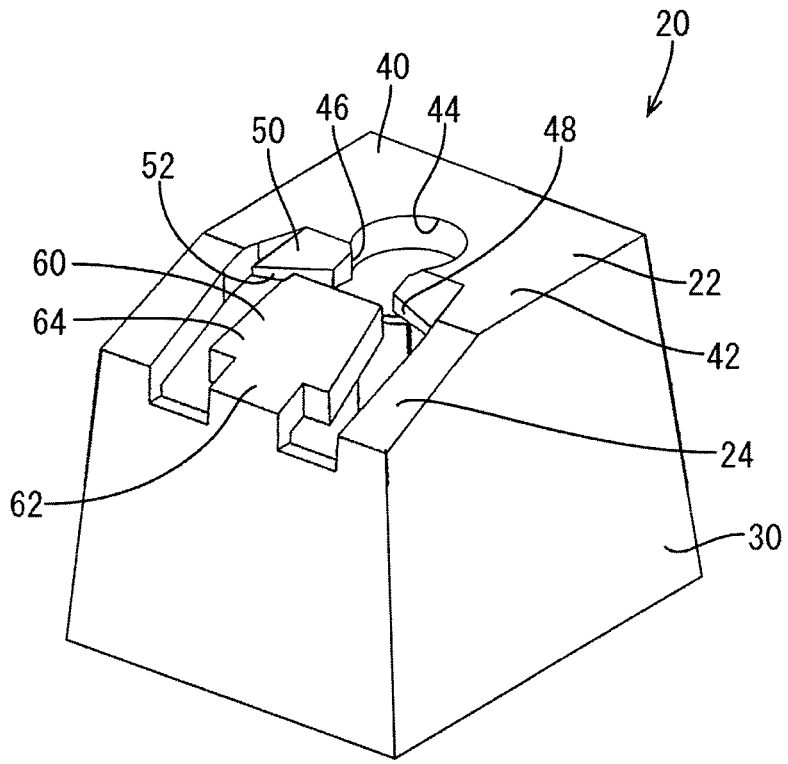
FIG. 1 is a perspective view of a clip mounting seat according one embodiment of the present technology.
Figure 2:
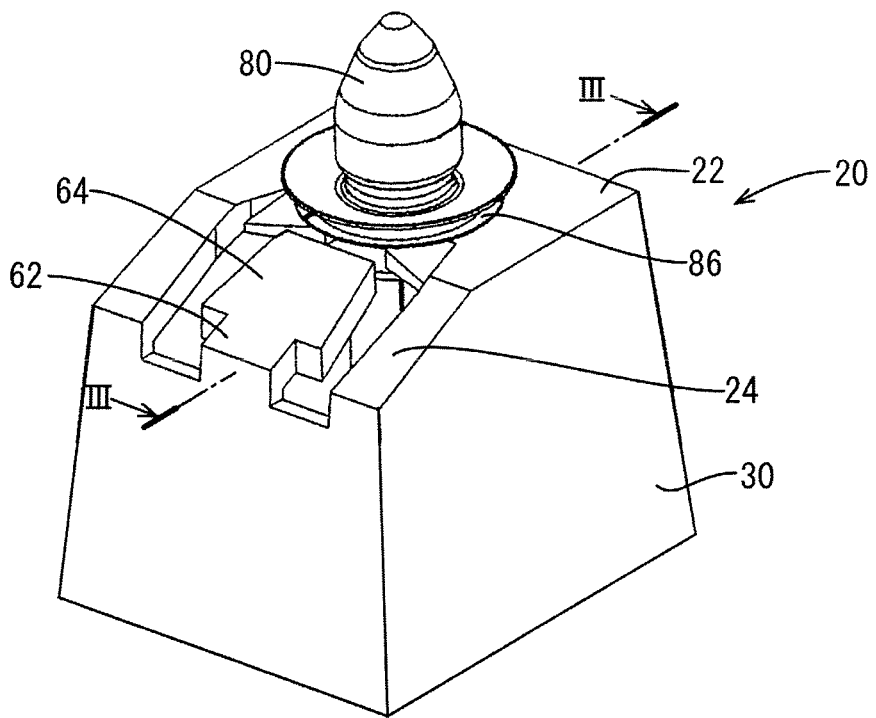
FIG. 2 is a perspective view of the clip mounting seat including a clip that is inserted in a stopper hole.
Figure 3:
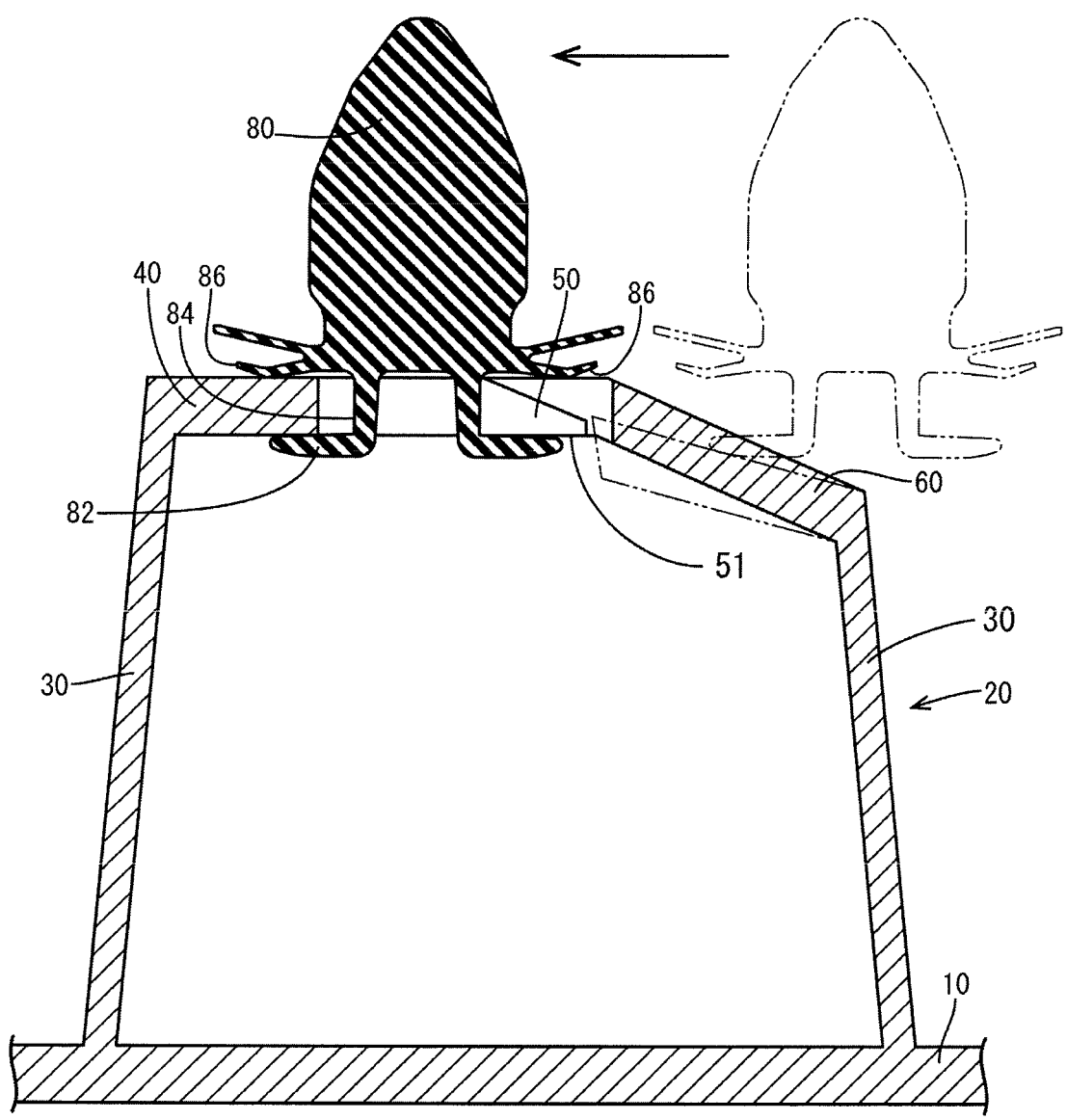
FIG. 3 is a cross-sectional view taken along line III-III in FIG. 2.

One embodiment of the present technology will be described with reference to FIGS. 1 to 4. A vehicular door trim that is mounted in a vehicle will be described as an example of a vehicular interior part. As illustrated in FIG. 3, the door trim includes a trim board 10 and a clip mounting seat 20 included in the trim board 10. The trim board 10 has a plate shape and is made of synthetic resin such as polypropylene.

Clip mounting seats 20 are mounted on a vehicular exterior side surface of the trim board 10. The clip mounting seats 20 are formed integrally with the trim board 10 with injection molding using synthetic resin such as polypropylene. As illustrated in FIGS. 2 and 3, a clip 80 is mounted in each clip mounting seat 20. The trim board 10 is connected to a door inner panel (not illustrated) of a vehicle with the clips 80.

A configuration of the clip mounting seat 20 will be described. As illustrated in FIGS. 1 and 3, the clip mounting seat 20 includes walls 30 each of which extends upward from the trim board 10, a mounting base 40, and an elastic stopper 60. The mounting base 40 is continuously at upper ends of the walls 30 and the clip 80 is fixed in the mounting base 40. The elastic stopper 60 extends from one of the walls 30.

Figure 4:
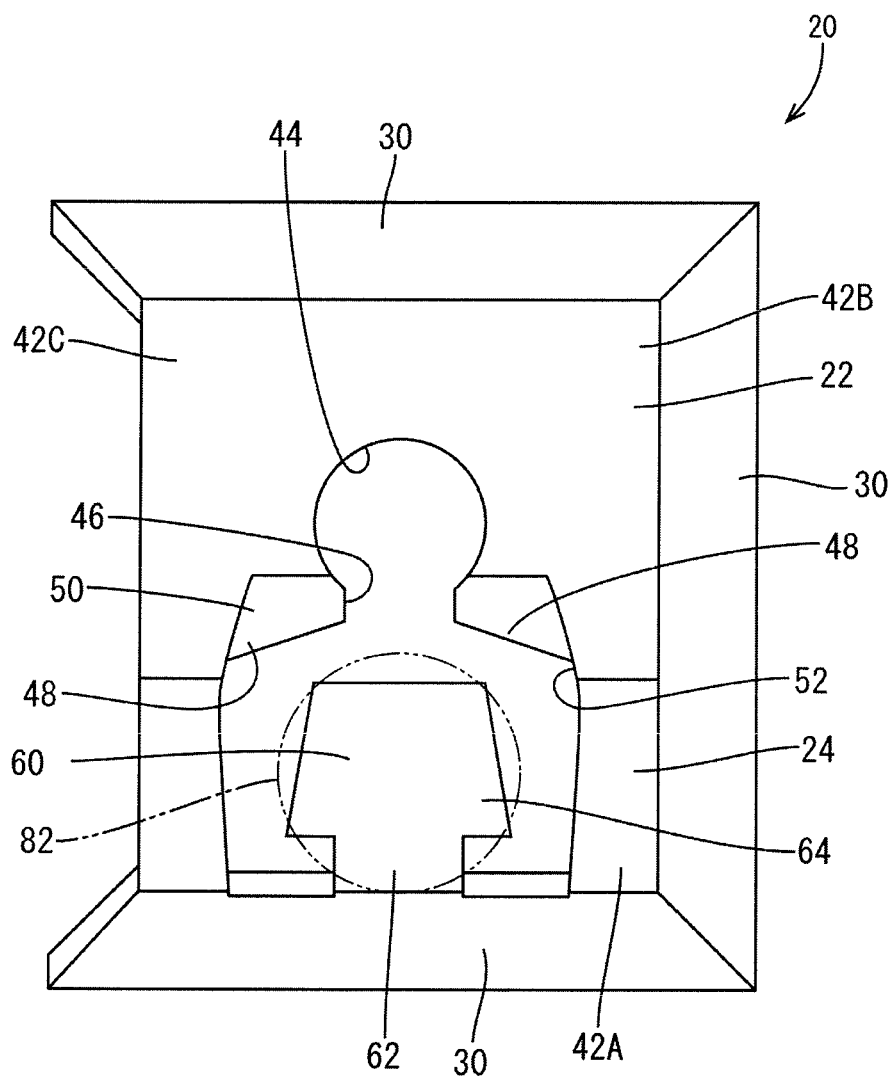
FIG. 4 is an upper view of the clip mounting seat.

As illustrated in FIGS. 1 and 4, three walls 30 extends from the trim board 10 and the mounting base 40 is at the upper ends of the walls 30. Each of the walls 30 has side edges and the side edges are connected to each other such that the ends of the walls 30 form a substantially U-shape as illustrated in FIG. 4, and the mounting base 40 is disposed at the ends of the U-shape. The mounting base 40 has peripheral edges that are mounting base edge portions 42. The mounting base edge portions 42 are continuous from the respective walls 30. One of the mounting base edge portions 42 (42C) is not continuous from the wall 30 and the mounting base edge portion 42C is open and exposed outside. The mounting base 40 includes a stopper surface portion 22 and an insertion surface 24. The stopper surface portion 22 is horizontally provided and the insertion surface 24 is continuous from the stopper surface portion 22 and sloped downward from the stopper surface portion 22 toward the wall 30 having the elastic stopper 60.

The mounting base 40 includes a stopper hole 44 in the stopper surface portion 22. A part of a hole edge of the stopper hole 44 is open and has an opening 46 and the elastic stopper 60 is opposite the opening 46. Namely, the hole edge of the stopper hole 44 has a C-shape. The opening 46 has an opening width that is equal to or smaller than a width of an edge of the elastic stopper 60 that is opposite the opening 46. The elastic stopper 60 extends from the upper end of the wall 30 toward the opening 46. Namely, the elastic stopper 60 extends from the mounting base edge portion 42A (see FIG.

4) toward the opening 46. The mounting base edge portions 42B, 42C are continuous from two side ends of the mounting base edge portion 42A having the elastic stopper 60. Namely, the mounting base edge portions 42B, 42C extend from the two side ends of the one of the walls 30 having the elastic stopper 60 and the mounting base edge portions 42B, 42C sandwich the elastic stopper 60 therebetween. The mounting base 40 has guide edges 48 (guide portions) that extend and spread continuously from the opening 46 toward the respective mounting base edge portions 42B, 42C. The guide edges 48 extend from opening ends of the hole edge at the opening 46 toward the mounting edge portions 42B, 42C and the guide edges 48 spread as they extend farther from the opening 46. Namely, a distance between the guide edges 48 increases as they extend farther from the opening 46. The guide edges 48 are edges of the stopper surface portion 22 and opposite the elastic stopper 60 having a predefined distance therebetween.

Sloped surface portions 50 are included on an upper surface of the stopper surface portion 22 continuously from the guide edges 48 (guide portion). Each of the sloped surface portions 50 (guide portions) is sloped upward from the elastic stopper 60 side toward the opening 46 or the stopper hole 44. Namely, the sloped surface portion 50 slopes upward from the guide edge 48 toward the opening 46. The guide edges 48 and the sloped surface portions 50 are between the opening 46 and the elastic stopper 60 and the clip 80 is guided by the guide edges 48 and the sloped surface portions 50 to the opening 46.

The mounting base 40 has an insertion hole 52 in the insertion surface 24. The insertion hole 52 is communicated with the stopper hole 44 through the opening 46. The elastic stopper 60 is within the insertion hole 52.

The elastic stopper 60 includes a basal portion 62 extending from the mounting base edge portion 42A and a clip receiver portion 64 extending from the basal portion 62 toward the opening 46. The basal portion 62 is narrower than the clip receiver portion 64. As illustrated in FIGS. 3 and 4, the clip receiver portion 64 is wider than the basal portion 62 and has a surface area that is substantially equal to an area of a flange portion 82 of the clip 80. The clip receiver portion 64 has a surface area supporting a substantially entire area of the flange portion 82. In this embodiment, the clip receiver portion 64 has a substantially trapezoidal shape and a distal end thereof is narrower than a basal end thereof near the basal portion 62.

Next, operations and effects of mounting of the clip 80 in the clip mounting seat 20 of this embodiment will be described.

When the clip 80 is mounted in the stopper hole 44, the clip 80 is put on the clip receiver portion 64 such that the flange portion 82 of the clip 80 is in contact with the clip receiver portion 64 as illustrated with a two-dot chain line in FIG. 3. The flange portion 82 covers almost entire area of the clip receiver portion 64. Then, the clip receiver portion 64 is pressed downwardly by the clip 80 such that the elastic stopper 60 is elastically deformed and bent downwardly. Specifically, the clip receiver portion 64 that is disposed opposite the opening 46 is moved downward and a space of the insertion hole 52 near the opening 45 is increased such that the flange portion 82 and a shaft 84 can be inserted through the increased space of the insertion hole 52. Namely, a surface level of the clip receiver portion 64 is lower than a surface level of a rear surface 51 of the sloped surface portion 50 (see FIG. 3) when the clip receiver portion 64 is pressed downward by the clip 80.

The clip 80 is moved along the clip receiver portion 64 in an insertion direction of the clip 80 as illustrated with an arrow in FIG. 3, that is, toward the opening 46, and the clip 80 is inserted in the insertion hole 52. A portion of the flange portion 82 on the stopper hole 44 side is inserted below the guide edges 48 and the sloped surface portions 50 (the guide portions), and a stopper portion 86 of the clip 80 is disposed on the sloped surface portions 50. Namely, the flange portion 82 and the stopper portion 86 sandwich the sloped surface portions 50 therebetween, and a lower surface of the stopper portion 86 is guided along the sloped surface portions 50, while the clip 80 is moved toward the stopper hole 44. As the clip 80 is further moved toward the stopper hole 44, the shaft 84 of the clip 80 is inserted through the opening 46 into the stopper hole 44 stably, surely and smoothly.

When the shaft 84 is in the stopper hole 44, as illustrated by a solid line in FIG. 3, the stopper portion 86 and the flange portion 82 of the clip 80 sandwich the stopper surface portion 22 therebetween. When the shaft 84 is in the stopper hole 44, the elastic stopper 60 is released from the elastic deformation and elastically recovers its original shape and the clip receiver portion 64 is opposite the opening 46. In the clip 80 that is in the stopper hole 44, portions of the stopper portion 86 and the flange portion 82 near the opening 46 are opposite an edge of the clip receiver portion 64 of the recovered elastic stopper 60. Further, the edge of the clip receiver portion 64 opposite the opening 46 has a width greater than the opening width of the opening 46. Therefore, the clip 80 is less likely to be moved out from the stopper hole 44 through the opening 46 and the insertion hole 52.

In this embodiment, as illustrated in FIG. 4, the clip receiver portion 64 of the elastic stopper 60 has a size substantially same as that of the flange portion 82 of the clip 80. The basal portion 62 is narrower than the clip receiver portion 64. According to such a configuration, great pressure force is not required to press and elastically deform the elastic stopper 60. The clip receiver portion 64 has a size substantially same as that of the flange portion 82 and therefore, the clip receiver portion 64 is pressed by the clip 80 while substantially an entire area of the flange portion 82 being contact with the clip receiver portion 64. Therefore, the clip receiver portion 64 can support an entire area of the flange portion 82 of the clip 80 such that the flange portion 82 of the clip 80 can press the clip receiver portion 64 with a stable pressing-down load.

The clip receiver portion 64 is pressed by the flange portion 82 with an entire area thereof. Therefore, even if a pressure load applying position is shifted from a center of the clip receiver portion 64, the flange portion 82 is less likely to be tilted with respect to the clip receiver portion 64 or less likely to slip down from the clip receiver portion 64.

In this embodiment, even if the flange portion 82 is inserted in the insertion hole 52 while a center of the flange portion 82 or an axis of the shaft 84 is shifted from a center of the opening 46, the shaft 84 is correctly guided to the opening 46. Specifically, even in such a case, the flange portion 82 is inserted below the sloped surface portions 50 and is further moved in the insertion direction. Then, the shaft 84 hits the guide edge 48 and is guided along the guide edge 48 toward the opening 46 and the stopper portions 86 are guided along the sloped surface portions 50 toward the opening 46. Thus, even if the clip 80 is inserted in the insertion hole 52 from a position shifted from the opening 46, the mounting error that the clip 80 cannot be inserted in the stopper hole 44 is less likely to occur and the clip 80 is inserted in the stopper hole 44 stably, surely and smoothly.

If the clip 80 is inserted in the insertion hole 52 while the flange portion 82 being tilted with respect to the stopper surface portion 22, the flange portion 82 can press the clip receiver portion 64 with a large contact area with respect to the clip receiver portion 64. Therefore, even if the clip 80 is inserted in the insertion hole 52 while being tilted, the clip 80 is less likely to be extremely tilted and slip down from the clip receiver portion 64. The clip 80 recovers its normal position such that the flange portion 82 is guided by the guide edge 48 and the sloped surface portion 50 to a horizontal position with respect to the stopper surface portion 22 and the clip 80 is inserted in the stopper hole 44 through the opening 46.

Even if the flange portion 82 is inserted in the insertion hole 52 while being tilted with respect to the stopper surface portion 22, the clip 80 recovers its normal position by the flange portion 82 that is inserted below the sloped surface portions 50. Specifically, if the flange portion 82 is inserted in the stopper hole 52 and below the sloped surface portions 50, the shaft 84 is guided by the guide edges 48 toward the opening 46 and the stopper portion 86 is guided by the sloped surface portions 50 toward the stopper hole 44 such that the clip 80 recovers a horizontal position and inserted in the stopper hole 44. Thus, even if the clip 80 is inserted in the insertion hole 52 while being tilted, the clip 80 can be inserted in the stopper hole 44 surely and stably. Therefore, the mounting error that the clip 80 is not inserted in the stopper hole 44 is less likely to occur.

According to the clip mounting seat 20 of this embodiment, even if the position of the clip 80 is shifted from the opening 46 or the clip 80 is tilted in mounting the clip 80 in the clip mounting seat 20 automatically with using a mounting device, the clip 80 can be guided to the stopper hole 44 surely and stably. Therefore, the mounting error of the clip 80 is less likely to occur and mounting efficiency of the clips 80 is improved.

According to this embodiment, when the clip 80 is inserted in the stopper hole 44 and the shaft 84 is stopped in the stopper hole 44, the clip 80 holds the stopper surface portion 22 between the stopper portion 86 and the flange portion 82, and the stopper portion 86 and the flange portion 82 are opposite the clip receiver portion 64 on the opening 46 side. According to such a configuration, the shaft 84 is less likely to be moved out from the stopper hole 44 through the opening 46 and the insertion hole 52.

<Other Embodiments>

The present technology is not limited to the description as described above with reference to the drawings. For example, the present technology may include following embodiments.

In the above embodiment, the clip receiver portion 64 has a substantially trapezoidal shape such that the end thereof is narrower than a portion near the basal portion 62. However, the shape of the clip receiver portion 64 is not limited as long as it has a substantially same size as the flange portion 82.

In the above embodiment, the mounting base 40 includes the sloped surface portions 50 near the guide edges 48 of the insertion hole 52. However, only the guide edges 48 may be included without including the sloped surface portions 50. With such a configuration, the shaft 84 can be inserted in the stopper hole 44 stably.

In the above embodiment, the pressing-down load of the clip 80 for pressing the clip receiver portion 64 is smaller by reducing a thickness or a width of the basal portion 62, and the pressing-down load of the clip 80 is greater by increasing the thickness or the width of the basal portion 62. In any configuration, the basal portion 62 is narrower than the clip receiver portion 64.

In the above embodiment, the clip mounting seat 20 is formed integrally with the trim board 10. However, it is not limited thereto. For example, the clip mounting seat 20 may be a separate component from the trim board 10.

The invention claimed is:

1. A clip mounting seat for mounting a clip, the clip mounting seat comprising:
   walls having side edges that are connected to each other and ends between the side edges;
   a mounting base disposed at the ends of the walls and including a stopper hole having a hole edge a part of which is open and having an opening, the stopper hole being configured to hold the clip inserted through the opening; and
   an elastic stopper extending from one of the ends of one of the walls toward the opening, the elastic stopper being opposite the opening, the elastic stopper including a basal portion that extends from the one end of the one wall and a clip receiver portion that extends from the basal portion toward the opening and is opposite the opening and wider than the basal portion, wherein
   the mounting base includes mounting edge portions extending from two side ends of the one end of the one wall having the basal portion, the mounting edge portions sandwiching the elastic stopper therebetween, and guide portions disposed between the opening and the elastic stopper and guiding the clip to the opening, and
   the guide portions include guide edges that extend and spread from the opening to the respective mounting edge portions and the guide edges are opposite the elastic stopper.

2. The clip mounting seat according to claim 1, wherein the guide portions include sloped surface portions that slope upward from the respective guide edges toward the opening.

3. The clip mounting seat according to claim 2, wherein the sloped surface portions are configured to guide a stopper portion of the clip such that the clip is guided to the opening.

4. The clip mounting seat according to claim 1, wherein the guide edges extend from opening ends of the hole edge at the opening toward the respective mounting edge portions, and a distance between the guide edges increases as they extend farther from the opening.

5. A clip mounting seat for mounting a clip, the clip mounting seat comprising:
   walls having side edges that are connected to each other and ends between the side edges;
   a mounting base disposed at the ends of the walls and including a stopper hole having a hole edge a part of which is open and having an opening, the stopper hole being configured to hold the clip inserted through the opening; and
   an elastic stopper extending from one of the ends of one of the walls toward the opening, the one of the ends of the one of the walls is opposite the opening and the elastic stopper being opposite the opening, the elastic stopper including a basal portion that extends from the one end of the one wall and a clip receiver portion that extends from the basal portion toward the opening and is opposite the opening and wider than the basal portion.

6. The clip mounting seat according to claim 5, wherein the walls include at least three walls and the side edges of the at least three walls are connected to each other such that the ends of the at least three walls form a substantially U-shape and the mounting base is disposed at the ends of the U-shape.

7. The clip mounting seat according to claim 5, wherein the mounting base further includes an insertion hole that is communicated with the stopper hole through the opening, the elastic stopper is in the insertion hole through which the clip is configured to be inserted toward the stopper hole through the opening.

8. The clip mounting seat according to claim 5, wherein the elastic stopper is configured to be elastically deformed to be bent down by pressure force applied by the clip.

9. The clip mounting seat according to claim 5, wherein the clip receiver portion has a receiving surface area configured to support a substantially entire area of a flange portion of the clip, and the clip receiver is a plate member and the receiving surface area thereof is configured to be in contact with a substantially entire area of a bottom surface of the clip.

10. The clip mounting seat according to claim 9, wherein a width of an edge of the elastic stopper that is opposite the opening is greater than an opening width of the opening.

11. The clip mounting seat according to claim 5, wherein a width of an edge of the elastic stopper that is opposite the opening is greater than an opening width of the opening.

12. A clip mounting seat for mounting a clip, the clip mounting seat comprising:
   walls having side edges that are connected to each other and ends between the side edges;
   a mounting base disposed at the ends of the walls and including a stopper hole having a hole edge a part of which is open and having an opening, the stopper hole being configured to hold the clip inserted through the opening; and
   an elastic stopper extending from one of the ends of one of the walls toward the opening, the elastic stopper being opposite the opening, the elastic stopper including a basal portion that extends from the one end of the one wall and a clip receiver portion that extends from the basal portion toward the opening and is opposite the opening and wider than the basal portion and is a plate member having a receiving surface area configured to be in contact with a substantially entire area of a bottom surface of the clip.

13. The clip mounting seat according to claim 12, wherein the elastic stopper is configured to be elastically deformed to be bent down by pressure force applied by the clip.

14. The clip mounting seat according to claim 12, wherein the receiving surface area of the elastic stopper is configured to have substantially a same area as that of the bottom surface of the clip.

15. A clip mounting seat for mounting a clip, the clip mounting seat comprising:
   walls having side edges that are connected to each other and ends between the side edges;
   a mounting base disposed at the ends of the walls and including a stopper hole having a hole edge a part of which is open and having an opening, the stopper hole being configured to hold the clip inserted through the opening; and
   an elastic stopper extending from one of the ends of one of the walls toward the opening, the elastic stopper being opposite the opening, the elastic stopper including a basal portion that extends from the one end of the one wall and a clip receiver portion that extends from the basal portion toward the opening and is opposite the opening and wider than the basal portion, wherein a width of an edge of the elastic stopper that is opposite the opening is greater than an opening width of the opening.

16. The clip mounting seat according to claim 15, wherein the clip receiver portion has a receiving surface area configured to support a substantially entire area of a flange portion of the clip.

17. The clip mounting seat according to claim 16, wherein the clip receiver portion is a plate member and the receiving surface area thereof is configured to contact the substantially entire area of a bottom surface of the clip.

18. A clip mounting seat for mounting a clip, the clip mounting seat comprising:
   walls having side edges that are connected to each other and ends between the side edges;
   a mounting base disposed at the ends of the walls and including a stopper hole having a hole edge a part of which is open and having an opening, the stopper hole being configured to hold the clip inserted through the opening; and
   an elastic stopper extending from one of the ends of one of the walls toward the opening, the one of the ends of the one of the walls is opposite the opening and the elastic stopper being opposite the opening, the elastic stopper including a basal portion that extends from the one end of the one wall and a clip receiver portion that extends from the basal portion toward the opening and is opposite the opening and wider than the basal portion,
   wherein the elastic stopper is configured to be elastically deformed to be bent down by pressure force applied by the clip,
   wherein the elastic stopper is bent down so as to be away from the mounting base.

19. A clip mounting seat for mounting a clip, the clip mounting seat comprising:
   walls having side edges that are connected to each other and ends between the side edges;
   a mounting base disposed at the ends of the walls and including a stopper hole having a hole edge a part of which is open and having an opening, the stopper hole being configured to hold the clip inserted through the opening; and
   an elastic stopper extending from one of the ends of one of the walls toward the opening, the elastic stopper being opposite the opening, the elastic stopper including a basal portion that extends from the one end of the one wall and a clip receiver portion that extends from the basal portion toward the opening and is opposite the opening and wider than the basal portion and is a plate member having a receiving surface area configured to be in contact with a substantially entire area of a bottom surface of the clip,
   wherein the elastic stopper is configured to be elastically deformed to be bent down by pressure force applied by the clip,
   wherein the elastic stopper is bent down so as to be away from the mounting base.

* * * * *